Figure 7:
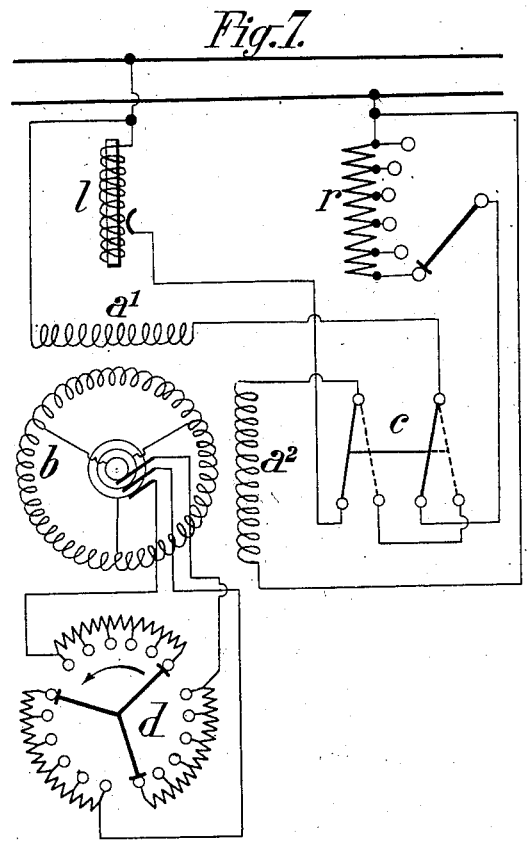

No. 739,096. PATENTED SEPT. 15, 1903.
R. D. DE LIGNIÈRES.
MEANS FOR STARTING AND REGULATING INDUCTION MOTORS.
APPLICATION FILED NOV. 9, 1901.
NO MODEL. 5 SHEETS—SHEET 1.
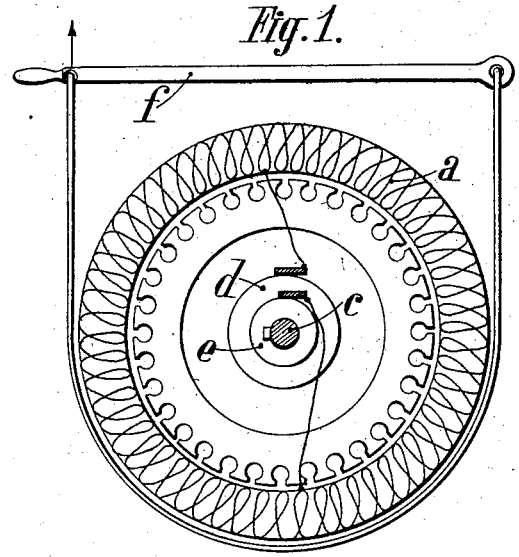
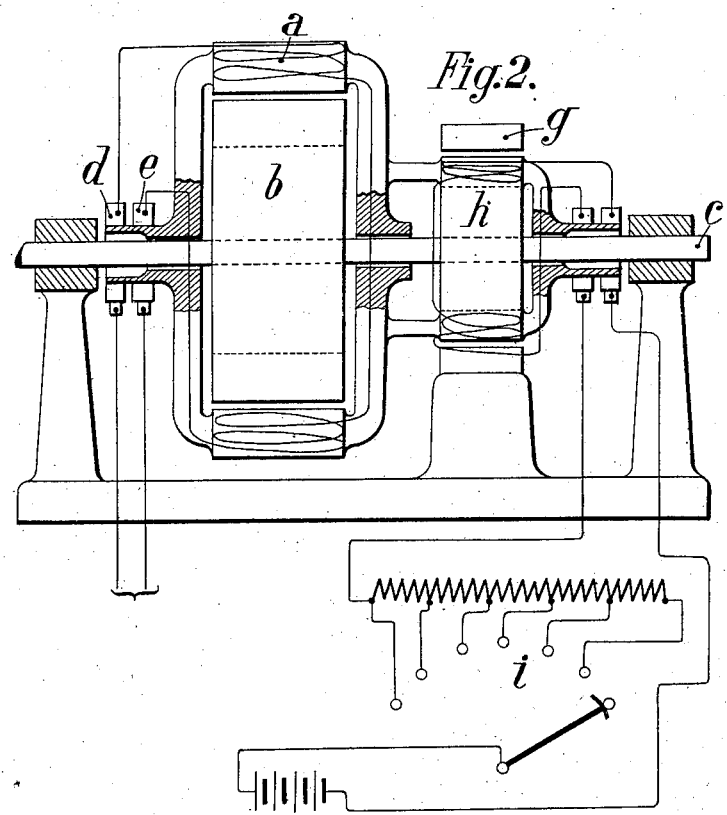
Witnesses:
Inventor
René D. de Lignières
By James L. Norris.
Atty.

No. 739,096. PATENTED SEPT. 15, 1903.
R. D. DE LIGNIÈRES.
MEANS FOR STARTING AND REGULATING INDUCTION MOTORS.
APPLICATION FILED NOV. 9, 1901.
NO MODEL. 5 SHEETS—SHEET 2.
Fig.3.
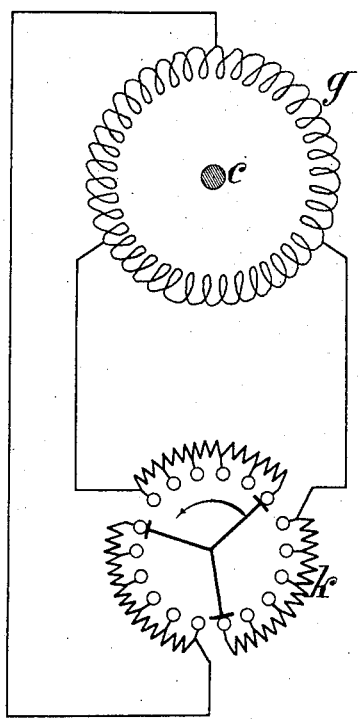
Fig.4. Fig.5. Fig.6.
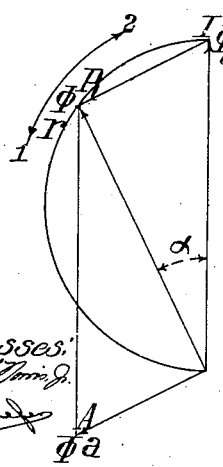
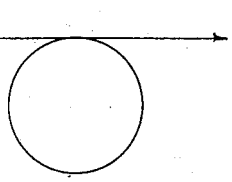
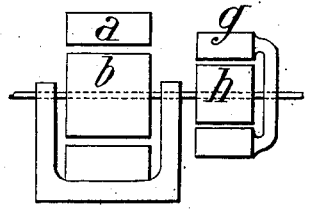
Witnesses:
Inventor
René D. de Lignières
By
James L. Norris.
Atty No. 739,096. PATENTED SEPT. 15, 1903.
R. D. DE LIGNIÈRES.
MEANS FOR STARTING AND REGULATING INDUCTION MOTORS.
APPLICATION FILED NOV. 9, 1901.
NO MODEL. 5 SHEETS—SHEET 3.

No. 739,096. PATENTED SEPT. 15, 1903.
R. D. DE LIGNIÈRES.
MEANS FOR STARTING AND REGULATING INDUCTION MOTORS.
APPLICATION FILED NOV. 9, 1901.
NO MODEL. 5 SHEETS—SHEET 4.

No. 739,096. PATENTED SEPT. 15, 1903.
R. D. DE LIGNIÈRES.
MEANS FOR STARTING AND REGULATING INDUCTION MOTORS.
APPLICATION FILED NOV. 9, 1901.
NO MODEL. 5 SHEETS—SHEET 5.
Fig. 9.
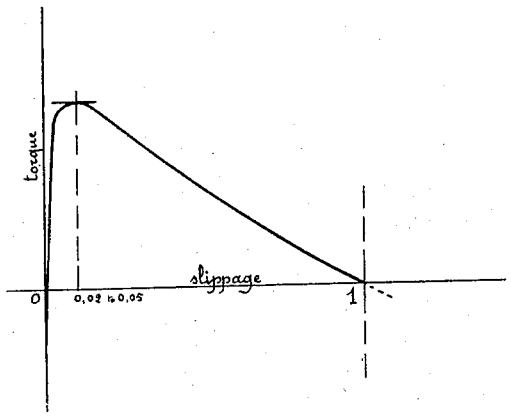
Fig. 10.
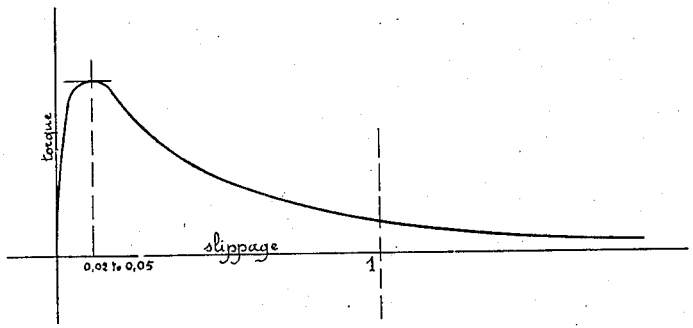
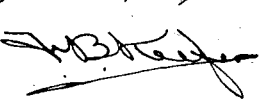
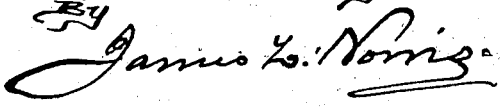

No. 739,096. Patented September 15, 1903.

UNITED STATES PATENT OFFICE.

RENÉ DASSY DE LIGNIÈRES, OF PARIS, FRANCE.

MEANS FOR STARTING AND REGULATING INDUCTION-MOTORS.

SPECIFICATION forming part of Letters Patent No. 739,096, dated September 15, 1903.

Application filed November 9, 1901. Serial No. 81,704. (No model.)

*To all whom it may concern:*

Be it known that I, RENÉ DASSY DE LIGNIÈRES, engineer, a citizen of the French Republic, residing at Paris, Seine, France, (whose post-office address is 169 Avenue de Wagram, in the said city,) have invented certain new and useful Improvements in Means for Starting and Regulating Induction-Motors, of which the following is a specification.

This invention has for its object to provide an improved apparatus for starting and regulating the speed of induction-motors which are fed by simple or polyphase alternating-current motors. These motors may be constructed as follows: One part of the motor (the rotor) is keyed fast to the motor-shaft, while the other part (the stator) is movable around this shaft, and either one part or the other may be employed as the armature or the inducing-field. The armature and the inducing-field are respectively the same as those used on the ordinary alternate-current simple or polyphase motors and they may have any suitable position with relation to each other—that is, they may be arranged concentrically or side by side. According to this invention the current is caused to flow by any suitable means into the inducing-field, so as to start the stator without load. When the angular speed of the stator has reached about the normal, which is nearly that corresponding to the synchronism, the rotation of said stator is progressively decreased and the rotor starts under load in a direction opposite to that of the stator. From this moment the rotor tends to maintain with respect to the stator a relative angular speed which is nearly constant and equal to that of synchronism, taking into account the variations resulting from the slips of the several torques. The proper angular speed of the rotor (which is equal to its angular speed with respect to that of the stator, to which must be added the angular speed of the stator) is allowed to vary according to the angular speed given to the stator, and according to the present invention it may be controlled by means of a suitable adjustable braking device acting on the stator.

In order that my invention may be fully understood, I will proceed to describe the same with reference to the annexed drawings, in which—

Figure 1 is an end view, partly in section, of a motor and brake embodying my invention. Fig. 2 is a side elevation of the same, partly in section, the motor being shown in connection with an electromagnetic brake. Figs. 3 and 4 are diagrammatic views illustrating the theory of the operation. Fig. 5 is a detail view in elevation, showing a modified arrangement for connecting the electromagnetic brake with the motor; and Figs. 6 and 7 are detail views showing two methods of lubricating the rotating parts.

Referring to Fig. 1, $a$ represents the stator (I shall presume it to be the inducing-field) of a motor, which is loose on the shaft $c$ and on which shaft is keyed the rotor $b$, (say the armature in the present case.) The current is sent through the rings $d$ $e$ into the inducing-field, which is started by any suitable device. The stator may be started without load through the agency of an auxiliary motor, which may be either electrical or mechanical, preferably the former, and where electrical means is employed for starting the stator without load the result accomplished depends on the obtainment of a dissymmetry in the inducing-winding. This winding may, for instance, be divided into two parts, one being at an angle of $\frac{M}{2p}$ behind the other, (2p being the number of the motor-poles,) and each of these parts is fed with the total tension or only a part thereof, which may be effected by interposing a resistance in one of the parts and in the other part a self-induction. When the stator has reached to its normal angular speed, which is nearly that of synchronism, it may be progressively stopped by means of a brake $f$, operated in the direction of the arrow. At the same time that the speed of the stator progressively decreases the rotor $b$ begins to start, even under charge, keeping with respect to the stator a relative angular speed nearly equal to that of synchronism, and its proper angular speed will be nearly that of synchronism when the brake has entirely stopped the stator. This speed will be brought to zero if the brake is entirely released. In the construction shown in the drawings the current is supposed to be sent to the inducing-field *a* through two rings *d* and *e* only, corresponding to the principal winding of the inducing-field, which in many cases is the only active winding when a starting with no load has been effected. For the purpose of effecting a starting without load most of the devices hitherto in use require the employment of at least one other ring corresponding to one end of the winding especially intended for starting, the other end being connected with a fourth ring or with one of the two rings *d e* or even with some point of the principal winding of the inducing-field between the rings *d e*. It is essential that the braking action on the stator be a progressive one; otherwise risk would be run of falling upon the descending curve of the torque of the motor, and the stator would be completely stopped without effecting the starting of the rotor, and at the same time the intensity of the current in the inducing-field would be excessive.

If a curve of the torque of an induction-motor in operation be drawn to determine the slippage of the armature with respect to the movable flux (in the case of simple alternating currents, as shown in Fig. 9) or of the total movable flux, (in the case of polyphase currents, as shown in Fig. 10,) this curve, when the armature does not slip, has a negative and very small value in the case of simple alternating currents or a null value in the case of polyphase currents. Fig. 9 of the drawings illustrates the torque curve of an induction-motor in the case of simple alternating currents with respect to slippage and to the movable flux, and Fig. 10 is an illustration of the torque in the case of polyphase currents. The value of the torque increases in the latter instance very rapidly, passing through the zero-point for small slippages in the case of simple alternating currents. Where the slippage increases, the torque is positive and increases (ascending curve) up to its highest value, which is obtained from a relatively small value of the slippage, (practically from $0.0^2$ to $0.0^5$.) If the slippage increases, the value of the torque diminishes proportionately (descending curve) and passes through the zero-point, the slippage being equal to the unity of power in the case of alternating currents and for an endless slippage in the case of polyphase currents. The stator of this motor is first given an angular speed which nearly corresponds to the synchronism, so that the useful movable flux (or the total movable flux) is practically fixed with respect to the armature. The starting of the rotor is secured by progressively decreasing the speed of the stator when the slippage of the useful movable flux increases with respect to the armature. It is obvious that the braking action of the stator must be a progressive one in order that the stator has the necessary time to acquire requisite acceleration, so that the slippage of the armature with respect to the movable flux has never a higher value than the one corresponding to the resisting torque represented by the descending curve, for the reason that if the slippage be of a higher value and braking action be too sudden the speed of the rotor would decrease too rapidly and slippage would then increase, causing the torque again to decrease until the rotor would stop.

Any form of electromagnetic brake may be used, comprising a stationary part (stator of the brake) and a movable part (rotor) movable with the stator of the motor, the connection between the rotor of the brake and the stator of the motor being either direct or through suitable interposed gearing. One of the two parts—for example, the armature—of the electromagnetic brake is identical with the armature of an induction-motor provided with a rotating magnetic field, (of the squirrel-cage pattern or polyphase armature with or without resistance.) The other part—that is, the inducing-field—produces a magnetic flux or a series of magnetic fluxes of constant direction, the same being formed by windings, which are traversed by a continuous current. This inducing-field may be massive or not, as desired, and is provided with projecting poles or poles of an annular form, and as the fluxes it produces (as well as those resulting from its action) are stationary with regard to the said inducing-field it can be subjected to great inductions. If the inducing-field is of an annular form, its windings can have any of the forms adopted for the principal inducing-windings of simple alternating-current asynchronous induction-motors. The inducing-field or the armature of the electromagnetic brake may be the rotor or the stator, and their relative arrangement may be effected in any convenient manner—that is, they may be arranged either concentrically or side by side. In Fig. 2 the inducing-field *h* of the brake constitutes the rotor, and the stator *a* (inducing-field) of the motor is directly connected therewith. The armature *g* of the brake is stationary. As stated above, the inducing-field *a* is started without load by any convenient means—for instance, by one of the means hereinafter described. When the inducing-field *a* rotates, the inducing-field *h* is rotated at the same speed or at a speed in a certain ratio therewith. It may therefore be supposed that the armature *g* is movable with respect to the stationary fields, thus producing induced currents in said armature. A retarding torque is also created, which is a function of the amount of excitation in *h* of the angular speed of the armature *g* with regard to that of the field *h* and of the resistance of the polyphase circuits of the armature *g*. It is easily understood that for a given resisting torque on the shaft *c* the inducing-field *a* can be braked, more or less, either by operating the rheostat *i*, which controls the intensity of the excitation in the armature $h$, or by acting on the resistances $k$ of the polyphase circuits of the armature $g$, Fig. 3. These two actions may be effected either simultaneously or separately and in a very simple manner, as they only require the operation of rheostats. In this manner I control the proper angular speed of the armature of the motor for a given torque. It is obvious that the motor may have any suitable disposition with respect to the electromagnetic brake—that is, these two parts may be concentric or side by side.

The theory of operation of the electromagnetic brake above described is similar to that of a motor with a revolving magnetic field, the inducing-flux of which is constant for a determined value of the exciting-current and opposed to that of a motor with a rotating magnetic field fed with single or polyphase alternate currents of a constant voltage, in which latter class of motors the resulting flux is nearly constant. Moreover, in this electromagnetic brake the inducing-flux instead of being movable, is stationary with regard to the inducing-core. For the sake of simplicity assume that the inducing-winding, excited by a continuous current, creates an inducing-flux $\Phi_i$, Fig. 3, which is constant for a determined value $I$ of the continuous inducing-current. For the sake of more simplicity in the following theory suppose the armature $g$ be movable with respect to the stationary inducing-field $h$ in opposition to the arrangement shown in Fig. 2. From the rotation of the armature with respect to the inducing-field a flux $\Phi_r$ results which is constant for a given speed and will be stationary if $\Phi_i$ is stationary. From the rotation of the armature with respect to the resisting-flux currents result in the armature which produce an induced flux $\Phi_a$ at an angle of ninety degrees behind $\Phi_r$, account being taken of the direction of rotation of $\Phi_r$ with respect to the armature. Now the inducing-field being stationary and the armature rotating in the direction of the arrow 1, the fluxes $\Phi_i$ and $\Phi_r$, which really are stationary, will rotate with respect to the armature in the direction of the arrow 2. The flux $\Phi_a$ will take the direction O A (shown by Fig. 3) at an angle of ninety degrees behind $\Phi_r$. The inducing-flux $\Phi_i$ is such that the resultant of its composition with $\Phi_a$ is $\Phi_r$. It therefore is represented by the segment O I, equal and parallel to A R. It is then seen that for a constant value of $\Phi_i$ the point R will move on a circumference having a diameter $OI = \Phi_i$, and every position of the said point R gives:

$$\overline{OR} = \Phi_r$$

$$\overline{RI} = \Phi_a$$

Let $r$ be the resistance of the induced polyphase winding of an accurately-determined fraction of the induced polyphase winding of the braking apparatus. If $\gamma$ designates the slip of the armature with respect to the inducing-field and $s\ s'$ quantities of a constant value, we can write:

$$\overline{RI} = \Phi_a = s\frac{\gamma \Phi_r}{r},$$

whence $$\frac{s\gamma}{r} = \frac{\Phi_a}{\Phi_r} = \mathrm{tg}\,\alpha. \quad (1)$$

The torque W will be $$W = s'. \Phi_a . \Phi_r = s'. \Phi_r^2 . \mathrm{tg}\,\alpha; \quad (2)$$

and as $$\Phi_r = \frac{\Phi_i}{\sqrt{1 + \mathrm{tg}^2 \alpha}}$$

then $$W = s' \Phi_i^2 \frac{\mathrm{tg}\,\alpha}{1 + \mathrm{tg}^2 \alpha} \quad (3)$$

$$s\frac{\gamma}{r} = \mathrm{tg}\,\alpha = \frac{s' \Phi_i^2 \pm \sqrt{s'^2 \Phi_i^4 - 4W^2}}{2W} \quad (4)$$

The foregoing equations enable me to determine in advance the working conditions of the apparatus. I may remark, however, that the equation 2 shows that the couple is proportional to the area of the triangle O R I. It therefore reaches the maximum for the value of $OI = \Phi_i$ when $\overline{RI} = \overline{OR}$—that is to say, when $\Phi_a = \Phi_r$ then $$\mathrm{tg}\,\alpha = \frac{s\gamma}{r} = 1$$

$$W_{\max.} = \frac{s'}{2} \Phi_i^2 \quad (5)$$

From this equation the value of the flux can be obtained, and therefore the minimum value of the exciting-current necessary (but not sufficient) for producing a braking action:

$$\Phi_i = \sqrt{\frac{2W}{s'}},$$

In this latter equation W designates the resisting torque applied to the motor in the case of a direct connection of the motor and the electromagnetic brake.

In polyphase-current motors the inducing-currents, if harmonics are not regarded, produce a movable flux having a direction of rotation that is well understood. In simple alternating-current motors the inducing-current produces an alternating flux which can be decomposed into two fluxes turning in opposite directions, a useful flux which rotates in the direction which is to be imparted to the armature, and a parasitical flux. In polyphase motors the parasitical fluxes annul each other and the movable flux has only one direction of motion.

I am aware that in motors having revolving magnetic fields fed by currents under a constant tension it is necessary for the purpose of obtaining a given starting torque that the resistance of the circuits in the armature have a determinated value. In the present case a similar condition exists—the ohmic resistance or the apparent resistance of the circuits in the armature must have a sufficient value for securing the braking for a given resisting torque applied on the armature of the motor. All the methods hitherto in use, according to which the starting and the regulation of the speed of motors with revolving magnetic fields result from an action on the induced windings, can therefore easily be applied to the present electromagnetic braking device, although in this case the inducing-flux instead of the resulting flux be practically constant.

The operations may naturally be simplified by giving the resistances of the induced windings a sufficient value for always securing the starting without the employment of slipping contacts; but in this case the slip of the electromagnetic brake during the normal working is greater. In order to reduce as far as possible the slip of the movable part of the brake in the normal working, the continuous exciting-current must be increased to its maximum value. At least for having a perfect braking action during the normal working—that is to say, for reducing to zero the slip of the movable part of the electromagnetic brake—a mechanical brake operated by a mechanical or electric device can be applied on this part. As far as possible this mechanical brake must be arranged so as to produce only a tangential action on the part to which it is applied, as shown in Fig. 4, wherein the straps are stretched in the direction of the arrows.

An electromagnetic brake of the kind described can be generally applied in the same manner as a friction-clutch with variable slip, the variations of which may be well determined. One of its parts—$h$, for example, Fig. 5—is connected with the driving part $b$, the other part, $g$, being connected with the shaft to be set into motion. This brake could also be applied to a single alternating-current motor, of which $b$ is the rotor and $a$ the stator, Fig. 5, the stator $a$ being always stationary. The rotor $b$ is started without load, and when its speed of rotation has reached nearly that of synchronism the brake is progressively operated by controlling the continuous current, which excites the clutch and the resistance of its induced part.

Generally speaking, for starting the motor without load, whether it is fed with single or polyphase alternating currents, two distinct methods can be employed according to whether or not the induced winding be connected with variable resistances or to whether or not it is of any convenient polyphase or short-circuited kind. In case the induced winding is connected with resistances the starting can be effected by feeding the inducing-circuits with the whole of the normal potential difference, and an excessive consumption of current will be avoided by acting on the resistances interposed in the circuits of the armature.

Fig. 1 illustrates one form of embodiment of the invention for effecting starting of the stator without load. The inducing-winding of the motor is divided into two parts $a'$ and $a^2$, disposed at an angle of about $\frac{180°}{2p}$ to each other, 2p indicating the number of poles. Simultaneously with the starting of the stator connections are established through the agency of a two-direction commutator in order that a resistance $r$ may be included in the circuit $a'$ and a self-induction $l$ in the circuit $a^2$, the circuits $a'$ and $a^2$ being fed with the total feeding tension, the hand-levers of the commutator $c$, in this instance, being in the position shown in full lines in Fig. 7. The induced winding $b$ of the motor is polyphase and is connected with a polyphase rheostat $d$, it being necessary before causing the current to pass for starting the motor without load to set the hand-lever of the rheostat $d$ in the position corresponding to the highest values of the resistances and to cause the highest value of these resistances to decrease in proportion as the speed of the motor increases until the circuits of the armature are finally short-circuited. When the starting without load is obtained, the hand-levers of the commutator are set in the position shown by dotted lines in Fig. 7 and the two parts $a'$ and $a^2$ of the inducing-winding are then connected in parallel and the resistance $r$ and also the self-induction $l$ are short-circuited. In the case of a polyphase short-circuited induced winding the starting is effected by feeding the inducing-circuits only with a sufficiently-reduced potential difference, and in this case the yielding of the armature of the motor will be increased.

Figure 8:
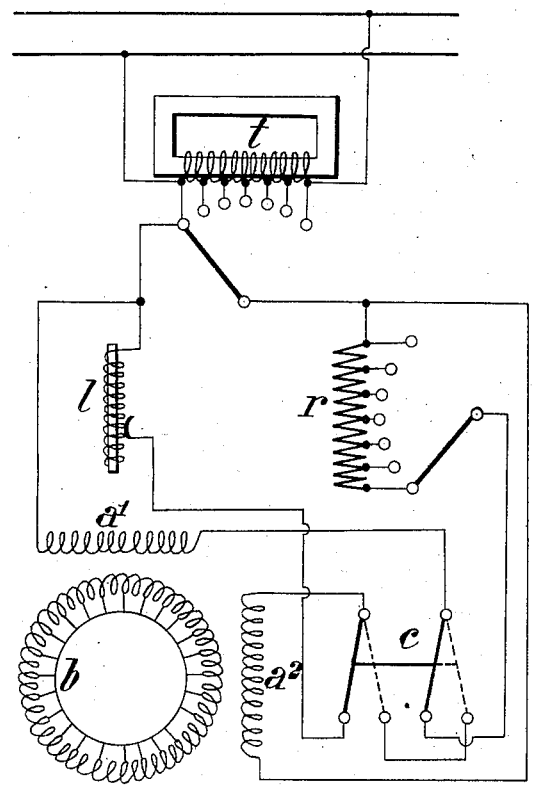

Fig. 8 illustrates another form of embodiment of the invention for effecting starting without load and corresponds with Fig. 7, which is modified in the case of the armature $b$ having polyphase windings which are short-circuited. The starting without load will always be effected by interposing a resistance $r$ in one of the parts $a'$ of the inducing-winding and a self-induction $l$ in the other part $a^2$; but it is necessary at the beginning of the starting to feed the circuits $a'$ and $a^2$ only with a sufficiently-reduced part of the potential difference by means of a transmitter $t$ of variable tension, which in the case of the above figure is a transmitter having a single winding. Potential difference is progressively increased by setting the hand-lever of the transmitter $t$ in proportion as the angular speed of the stator increases. When the starting is effected, both of the parts $a'$ and $a^2$ of the inducing-winding are connected again in parallel by means of the switch $c$.

Having now particularly described and ascertained the nature of my invention and in what manner the same may be performed, I declare that what I claim is—

In an apparatus for starting and regulating the speed of alternating-current motors, a rotary shaft, having the stator of the motor loosely mounted thereon and the rotor of the motor keyed thereto, means for starting the rotation of the stator without load, and an electromagnetic brake acting upon the stator, for the purpose described, the same comprising an inducing-field and an armature, one of these parts being fixed and the other movable, the latter being connected and movable with the stator of the motor, the said inducing-field being excited by a continuous current and the said armature being the same as the armature of an induction-motor having a revolving magnetic field, the braking action being obtained and regulated by varying the intensity of the current in said inducing-field; by varying the resistances interposed in the circuits of said armature, or by effecting these two operations simultaneously.

In testimony whereof I have hereunto set my hand in presence of two subscribing witnesses.

RENÉ DASSY DE LIGNIÈRES.

Witnesses:
 EDWARD P. MACLEAN,
 EMILE KLOTZ.